(12) United States Patent
Huth et al.

(10) Patent No.: US 10,171,236 B2
(45) Date of Patent: Jan. 1, 2019

(54) METHOD FOR OPERATING A PRIMARY UNIT

(71) Applicant: Robert Bosch GmbH, Stuttgart (DE)

(72) Inventors: Christopher Huth, Leonberg (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 170 days.

(21) Appl. No.: 15/262,699

(22) Filed: Sep. 12, 2016

(65) Prior Publication Data
US 2017/0078092 A1   Mar. 16, 2017

(30) Foreign Application Priority Data
Sep. 16, 2015   (DE) .......................... 10 2015 217 735

(51) Int. Cl.
*H04L 9/08* (2006.01)
*G06F 21/60* (2013.01)

(52) U.S. Cl.
CPC .......... *H04L 9/0838* (2013.01); *G06F 21/606* (2013.01); *H04L 9/0869* (2013.01); *H04L 2209/24* (2013.01)

(58) Field of Classification Search
CPC .... H04L 9/0838; H04L 9/0869; G06F 21/606
USPC ........................................................ 713/189
See application file for complete search history.

(56) References Cited

U.S. PATENT DOCUMENTS

| | | | | | |
|---|---|---|---|---|---|
| 6,654,883 | B1 * | 11/2003 | Tatebayashi | ....... | G06Q 20/3674 380/282 |
| 6,934,848 | B1 * | 8/2005 | King | ....... | G06F 21/33 705/65 |
| 7,840,817 | B2 * | 11/2010 | Tagashira | ....... | H04N 1/4486 713/186 |
| 8,522,028 | B2 * | 8/2013 | Brique | ....... | G06F 21/445 380/277 |
| 2002/0034300 | A1 * | 3/2002 | Thuvesholmen | ..... | H04L 9/0643 380/256 |
| 2005/0188194 | A1 * | 8/2005 | Fascenda | ....... | H04L 63/0272 713/155 |
| 2008/0019514 | A1 * | 1/2008 | Stromberg | ....... | H04L 63/06 380/46 |
| 2009/0006855 | A1 * | 1/2009 | Tuyls | ....... | H04L 9/3218 713/182 |
| 2009/0055645 | A1 * | 2/2009 | Park | ....... | H04L 43/0864 713/168 |

(Continued)

*Primary Examiner* — Michael S McNally
(74) *Attorney, Agent, or Firm* — Norton Rose Fulbright US LLP; Gerard Messina (57) ABSTRACT

A method for operating a primary unit which exchanges pieces of information with a secondary unit, including receiving first pieces of information from the secondary unit, the first pieces of information formed as a function of at least one first measured value of a physical variable in the area of the secondary unit and as a function of a first random number; measuring the physical variable in the area of the primary unit to obtain a second measured value; ascertaining a first estimated value for the first random number as a function of the first pieces of information and the second measured value; measuring the physical variable in the area of the primary unit to obtain a third measured value; forming second pieces of information as a function of the first estimated value and the third measured value; transmitting the second pieces of information to the secondary unit.

22 Claims, 6 Drawing Sheets

(56) References Cited

U.S. PATENT DOCUMENTS

| | | | |
|---|---|---|---|
| 2009/0268911 A1* | 10/2009 | Singh | H04L 9/0844 380/270 |
| 2009/0268914 A1* | 10/2009 | Singh | H04L 9/0822 380/279 |
| 2009/0271622 A1* | 10/2009 | Singh | H04L 9/3273 713/168 |
| 2010/0023760 A1* | 1/2010 | Lee | G06F 21/10 713/158 |
| 2011/0110522 A1* | 5/2011 | Kwon | H04W 84/18 380/270 |
| 2011/0280397 A1* | 11/2011 | Patwar | H04L 63/06 380/44 |
| 2013/0132731 A1* | 5/2013 | Ruan | G06F 21/34 713/184 |
| 2015/0117646 A1* | 4/2015 | Best | H04W 12/08 380/270 |

* cited by examiner

METHOD FOR OPERATING A PRIMARY UNIT

CROSS REFERENCE

The present application claims the benefit under 35 U.S.C. § 119 of German Patent Application No. DE 102015217735.1 filed on Sep. 16, 2015, which is expressly incorporated herein by reference in its entirety.

BACKGROUND INFORMATION

The present invention relates to a method for operating a primary unit, the primary unit exchanging information with a secondary unit. An information exchange of this type occurs, for example, prior to a cryptographically protected communication between the two units, for example, to agree on a secret key between the two units via a non-secure communication channel, which could be intercepted by an attacker.

The present invention further relates to a secondary unit and operating methods for the primary and secondary units, as well as to a method for operating a system, which includes at least one primary unit and one secondary unit.

SUMMARY

An object of the present invention is to protect the information exchange of the primary unit with other units, for example, a secondary unit, thus allowing attackers monitoring the information exchange to obtain as little useful information as possible.

This object is achieved by the method mentioned at the outset including the following steps: receiving first pieces of information from the secondary unit, the first pieces of information being formed as a function of at least one measured value of a physical variable in the area of the secondary unit and as a function of a first random number; measuring the at least one physical variable in the area of the primary unit to obtain a second measured value; ascertaining a first estimated value for the first random number as a function of the first pieces of information and the second measured value; measuring the at least one physical variable in the area of the primary unit to obtain a third measured value; forming second pieces of information as a function of the first estimated value and the third measured value; transmitting the second pieces of information to the secondary unit.

The method advantageously makes it possible to protect the information exchange between the primary and secondary units. In particular, the primary unit may ascertain the estimated value of the random number selected by the secondary unit by using the locally ascertained second measured value, so that, in particular, in the case of highly correlated first and second measured values, a reliable mechanism is provided for the primary unit to ascertain the exact or almost exact value of the first random number as the first estimated value. When this is successfully accomplished, both units have the same first random number available, which may be used, for example, as the basis for forming the secret cryptographic keys locally in both units, whereby the further communication between the units may thus be protected. Transmitting the second pieces of information formed according to the present invention to the secondary unit enables an analysis by the secondary unit, for example, regarding whether the primary unit was able to ascertain a sufficiently precise estimated value for the first random number.

Particularly advantageously, the method according to the present invention uses the correlation between the first and second measured values. In one specific embodiment, the measured value may include, for example, one or more properties of one of the two units for the wireless channel used for the information exchange. Although the term "measured value" is used in singular here, the "measured value" may, for the purposes of the present invention, also include multiple values, for example, values representable in the form of a vector or matrix, and/or in any other form, including, for example, channel matrix H of a MIMO (multiple input-multiple output) wireless system, or the like. In general, it may be advantageous to represent the measured value or, in the case of multiple measured values, the measured values, as a digital data word.

In a particularly preferred specific embodiment, a received signal strength (RSS) of a wireless receiver of the particular unit is used as first and second (and, as the case may be, additional) measured values. In this case, use is made of the fact that wireless channels are generally reciprocal and, at least from time to time, during a relevant coherence time, have a generally constant pulse response.

However, the use of the principle according to the present invention is not limited to measured values regarding wireless channels, but may also use comparable measured variables such as, for example, received signal strength of cable-bound or optical communication channels and/or dispersion of optical signals in optic fibers and the like, as long as it is ensured that both units receive preferably highly correlated measured values via the respective measurements, which may usually be achieved by generally reciprocal transmission paths such as, for example, wireless signal transmission in free space or in electrical or optical cables. Optical transmissions in free space, in particular, also in atmospheric or orbital systems, are also possible.

For example, measured values as defined in the present invention may be ascertained, for example, in the primary unit while a message is received from the secondary unit, and vice-versa. For example, the primary unit may ascertain the RSS value or its digital representation as a measured value when receiving such a message.

In a preferred specific embodiment it is provided that the formation of the first pieces of information includes the following steps: encoding the first random number using a first encoding method to obtain a first encoded random number, the first encoding method and a corresponding first decoding method being known to both the secondary unit and the primary unit; masking the first encoded random number, in particular, by applying an exclusive-or (XOR) link to the first measured value and the first encoded random number to obtain the first pieces of information; and ascertaining the first estimated value of the first random number includes the following steps: unmasking the first pieces of information, in particular, by applying an exclusive-or link to the first pieces of information and the second measured value to obtain unmasked first pieces of information; decoding the unmasked first pieces of information using the first decoding method to obtain the first estimated value for the first random number.

The masking and unmasking step advantageously further conceals the encoded random number against a potential attacker, who analyzes the first pieces of information whereby the first random number and its transmission within the first pieces of information is better protected.

In a further advantageous specific embodiment it is provided that the formation of the second pieces of information includes the following steps: encoding the first estimated value using the first encoding method to obtain a first encoded estimated value; and masking the third measured value, in particular, by applying an exclusive-or link to the third measured value and the first encoded estimated value. In this way, it is possible to transmit the third measured value and the encoded estimated value in the form of the second pieces of information relatively securely to the secondary unit, which may analyze these second pieces of information and recognize, for example, whether the primary unit was able to ascertain a sufficiently precise estimated value for the first random number.

In a further advantageous specific embodiment it is provided that the primary unit ascertains a secret key, for example, for a possible later encrypted communication with the secondary unit, as a function of the first estimated value and/or the first measured value and/or the second measured value and/or the third measured value.

As a further way of achieving the object of the present invention, a method is provided according to claim 8 for operating a secondary unit, the secondary unit exchanging information with a primary unit, for example, the primary unit according to the present invention. The method includes the following steps: forming first pieces of information as a function of at least one first measured value of a physical variable in the area of the secondary unit and as a function of a first random number; transmitting the first pieces of information from the secondary unit to the primary unit; receiving second pieces of information from the primary unit; analyzing the second pieces of information.

In a particularly preferred manner, the formation of first pieces of information in the secondary unit includes the following steps: encoding the first random number using a first encoding method to obtain a first encoded random number, the first encoding method and a corresponding first decoding method being known to both the secondary unit and the primary unit; masking the first encoded random number, in particular, by applying an exclusive-or link to the first measured value and the first encoded random number to obtain the first pieces of information.

The first random number may be ascertained in the second unit, for example, by using a random number generator or a pseudo-random number generator.

As a further way of achieving the object of the present invention, a method for operating a system according to an embodiment of the present invention.

As a further way of achieving the object of the present invention, a primary unit is provided for exchanging information with a secondary unit according to an embodiment of the present invention, the primary unit being designed for carrying out the method according to an embodiment of the present invention.

As a further way of achieving the object of the present invention, a secondary unit is provided for exchanging information with a primary unit according to an embodiment of the present invention, the secondary unit being designed for carrying out the method according to an embodiment of the present invention.

The primary unit and/or the secondary unit may be, for example, part of a mobile or stationary system or device. It is conceivable, for example, to equip mobile telephones with the primary and/or secondary unit according to the present invention or to supplement existing CPUs of such devices with the functionality according to the present invention. Further specific embodiments may provide equipping control units, in particular, of motor vehicles, with the primary and/or secondary unit according to the present invention.

In general, a control unit of the primary and/or secondary unit according to the present invention may include a CPU (for example, a microprocessor, a digital signal processor, a programmable logic device, or the like, or an ASIC (Application-Specific Integrated Circuit)) for carrying out the method according to the present invention. Advantageously, due to further specific embodiments, the primary and/or secondary unit according to the present invention may further include(s) a transmitting and/or receiving device for electromagnetic signals, in particular, wireless signals, wirebound signals (optical or electrical); the receiving device may be designed, for example, for ascertaining the measured values (for example, RSS parameters) according to the present invention.

Further advantageous embodiments are described herein.

Further features, possible uses, and advantages of the present invention are given in the description of exemplary embodiments of the present invention that follows, which are illustrated in the figures. All described or illustrated features alone or in arbitrary combination form the subject matter of the present invention, regardless of their summarization in the patent claims or their back-reference and regardless of their wording or illustration in the description and the figures.

DETAILED DESCRIPTION OF EXAMPLE EMBODIMENTS

Figure 1:
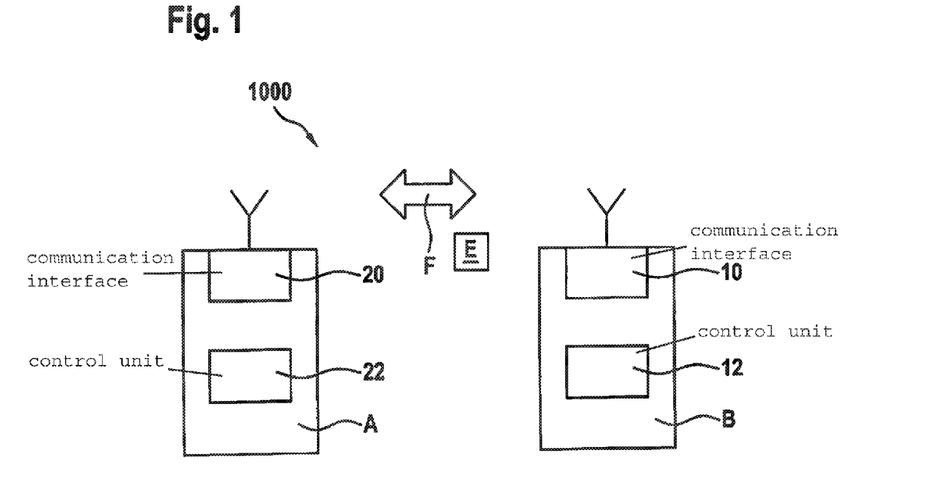
FIG. 1 schematically shows a block diagram of a primary unit and a secondary unit according to one specific embodiment.

FIG. 1 schematically shows a block diagram of a primary unit B and a secondary unit A according to one specific embodiment. Primary unit B includes a communication interface 10 for exchanging information with secondary unit A, as well as a control unit 12, which controls the information exchange with secondary unit A and, as the case may be, the further operation of primary unit B. For this purpose, control unit 12 may include a CPU (for example, a microprocessor, a digital signal processor, a programmable logic device, or the like, or an ASIC).

Communication interface 10 is here designed as a wireless interface, for example, including a conventional wireless transceiver, so that primary unit B may exchange information with secondary unit A via wireless channel F.

Secondary unit A may similarly include a communication interface 20 designed as a wireless interface, and a control unit 22 of its own, which may be designed comparably to control unit 12 of primary unit B. Accordingly, FIG. 1 shows a communication system 1000 including both units A, B.

In addition to the two units A, B, FIG. 1 also shows an attacker E, which possibly monitors and analyzes the information exchange between the two units A, B via wireless channel F.

Figure 2:
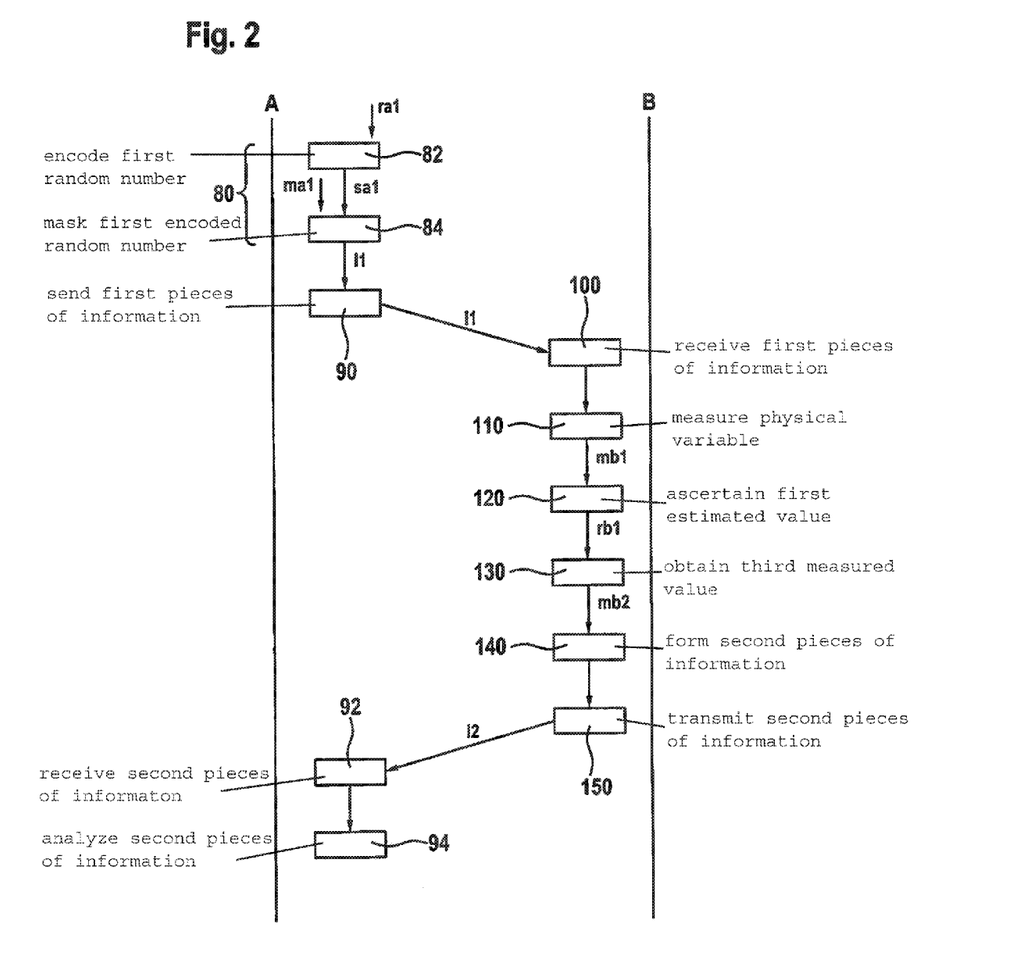
FIG. 2 schematically shows a flowchart of one specific embodiment of the method according to the present invention.

With reference to FIG. 2, a specific embodiment of the method according to the present invention is described below, whose subject matter is the secure exchange of information between units A, B, for example, with the purpose of providing both units A, B with a key known to both, but otherwise secret (for example, to third party E), for example, in the form of a digital data word, which they may henceforth use for encrypted communication via wireless channel F. In particular, the method according to the present invention is used for enhancing the security of the information exchange between units A, B, in the phase where they are unable to communicate in already encrypted form via wireless channel F.

Initially, in step 80 (FIG. 2), which includes two sub-steps 82, 84, secondary unit B (FIG. 1) forms first pieces of information I1 as a function of at least one first measured value ma1 of a physical variable in the area of secondary unit A and as a function of a first random number ra1.

First measured value ma1 is, for example, a received signal strength RSS as it is ascertainable, for example, by a transceiver of communication interface 20 (FIG. 1) of secondary unit A, for example, when receiving wireless signals from primary unit B. First measured value ma1 may be represented as a digital data word, for example, without loss of generality, which is assumed for the further description. This applies also to the other variables discussed.

First random number ra1 may be ascertained by secondary unit A itself, for example, by a random or pseudo-random number generator integrated into it or its control unit 22. However, alternatively, secondary unit A may also get the first random number from another source; however, the transmission from the other source to secondary unit A is to take place in such a way that this transmission is not interceptable by attacker E. First random number ra1 may be represented as a digital data word, for example, without loss of generality, which is assumed for the further description. This applies also to the other variables discussed.

Sub-step 82 of the method provides for encoding first random number ra1 using a first encoding method to obtain a first encoded random number sa1, the first encoding method and a corresponding first decoding method being known to both secondary unit A and primary unit B, for example, via previous agreement or parameterization in control units 12, 22 or the like.

Sub-step 84 provides for masking first encoded random number sa1 to obtain first pieces of information I1 therefrom, which are then sent from secondary unit A to primary unit B in step 90, for example, via (non-secure) wireless channel F, see FIG. 1. Masking 84 takes place in a particularly preferred specific embodiment via an exclusive-or (XOR) link between first measured value ma1 and first encoded random number sa1, i.e., $$I1 = ma1 \text{ XOR } sa1 \quad \text{(Equation 1)}.$$

Primary unit B receives first pieces of information I1 in step 100. Primary unit B then carries out a measurement, in step 110, specifically a measurement of the same physical variable that was the object of the measurement of first measured value ma1 by secondary unit A, i.e., here of the RSS parameter, whereby a second measured value mb1 is obtained. The second measured value may be ascertained, for example, by a transceiver of communication interface 10 (FIG. 1) of primary unit B, while a wireless signal of secondary unit A is being received.

It is not strictly necessary to ascertain second measured value mb1 chronologically after receiving 100 first pieces of information I1. In other specific embodiments, for example, a measured value, here the RSS parameter, may be ascertained periodically, and as soon as first pieces of information I1 have been received by primary unit B, the RSS measured value ascertained the last time previously may be resorted to as second measured value.

In step 120, a first estimated value rb1 for first random number ra1 is ascertained as a function of first pieces of information I1 and second measured value mb1 with the purpose of inferring, as accurately as possible, the first random number ra1 actually used by secondary unit A.

Figure 3:
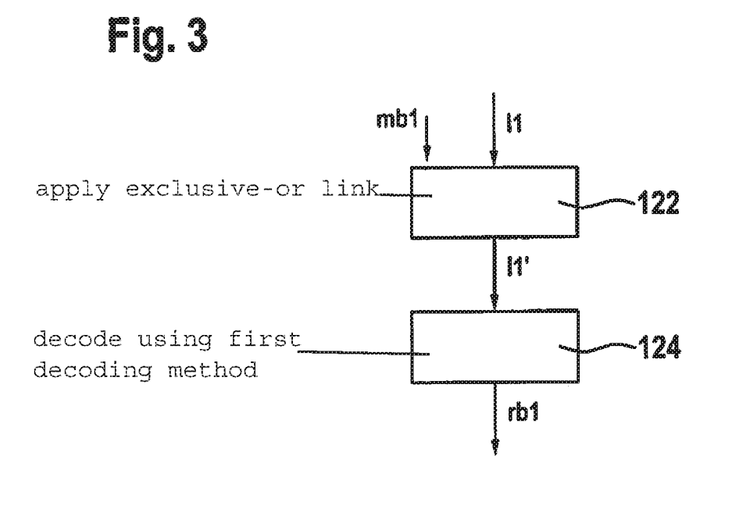
FIGS. 3, 4 each schematically shows a flow chart of a further specific embodiment of the method according to FIG. 2.

In one preferred specific embodiment, ascertaining 120 first estimated value rb1 for first random number ra1 includes the following steps, see also the flow chart of FIG. 3: unmasking 122 first pieces of information I1, in particular, by applying an exclusive-or link to first pieces of information I1 and second measured value mb1 to obtain unmasked first pieces of information I1'; decoding 124 unmasked first pieces of information I1' using the first decoding method to obtain first estimated value rb1 for first random number ra1.

As described previously, in one specific embodiment first pieces of information I1 may be ascertained using the following equation, which describes the masking procedure with the aid of an XOR operation:

$$I1 = ma1 \text{ XOR } sa1.$$

Unmasking 122 via repeated XOR operation, applied to first pieces of information I1 and second measured value mb1 results in unmasked information:

$$I1' = I1 \text{ XOR } mb1 = (ma1 \text{ XOR } sa1) \text{XOR } mb1 \quad \text{(Equation 2)}$$

which may be converted into $$I1' = (ma1 \text{ XOR } mb1) \text{XOR } sa1 \quad \text{(Equation 2a)}$$

As long as a theoretically ideal case is assumed where first measured value ma1 ascertained by secondary unit A is identical to second measured value mb1 ascertained by primary unit B, i.e., ma1=mb2, it results from Equation 2a:

$$I1' = (ma1 \text{ XOR } ma1) \text{XOR } sa1 = 0 \text{ XOR } sa1 = sa1 \quad \text{(Equation 3)}$$

Therefore, by unmasking 122 measured values ma1, mb1, which are identical in the presently discussed theoretical ideal case, in secondary unit A first encoded random number sa1 may be ascertained according to Equation 3, and via subsequent decoding 124, first encoded random number sa1 may be directly transformed exactly into first random number ra1, as provided by unit A, whereby primary unit B would now also be in possession of first random number ra1.

However, due to actual conditions, second measured value mb2 will be different from first measured value ma1, so that unmasking 122 according to Equation 2a will result in unmasked pieces of information I1', which at least in some bit locations of the relevant digital data word do not coincide with first encoded random number sa1. However, since preferably an error-correcting encoding and decoding method is used for steps 82, 124, based on the comparatively small differences between measured values ma1, mb2, it is possible for primary unit B to ascertain, in step 124, a first estimated value rb1 for first random number ra1 which is identical to first random number ra1. Primary unit B thus advantageously also attains the possession of first random number ra1 and may use it, for example, for encrypted communication with secondary unit A.

In order to further enhance the security of the method according to the present invention compared to conventional approaches, measurement of at least one physical variable in the area of primary unit B is provided for in step 130 to obtain a third measured value mb2. The measurement may be carried out similarly to measurement 110.

Figure 4:
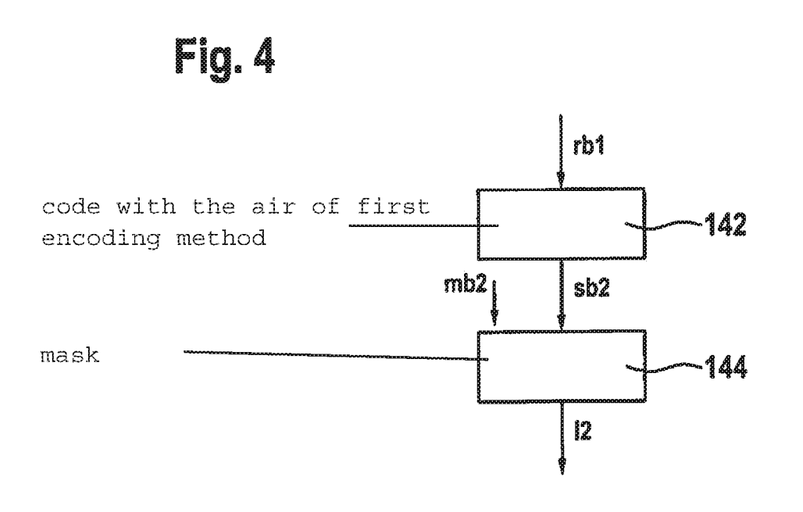

Finally, in step 140, second pieces of information I2 are formed by primary unit B as a function of first estimated value rb1 and third measured value mb2; due to one advantageous specific embodiment, formation 140 of second pieces of information I2 includes the following steps, see also FIG. 4: encoding 142 of first estimated value rb1 with the aid of the first encoding method to obtain a first encoded estimated value sb2, and masking 144 of third measured value mb2, in particular, by applying an exclusive-or (XOR) link to third measured value mb2 and first encoded estimated value sb2, which results in the following equation:

$$I2 = (mb2 \text{ XOR } sb2) \qquad \text{(Equation 4)}$$

In the case where the first random number has been previously successfully ascertained, first encoded estimated value sb2 corresponds to encoded first random number ra1, because first estimated value rb1 is identical to first random number ra1.

In step 150, second pieces of information I2 are transmitted to secondary unit A, which receives it in step 92 and analyzes it in step 94.

Analysis 94 of second pieces of information I2 in secondary unit A may include the following steps, for example:

Unmasking second pieces of information I2 by applying an exclusive-or (XOR) link to second pieces of information I2 and a fourth measured value ma2, which was ascertained by secondary unit A similarly to first measured value ma1, which results in unmasked second pieces of information I2':

$$I2' = (I2 \text{ XOR } ma2) = (mb2 \text{ XOR } sb2) \text{XOR } ma2 \qquad \text{(Equation 5)},$$

converted into $$I2' = (mb2 \text{ XOR } ma2) \text{XOR } sb2 \qquad \text{(Equation 5a)}$$

From Equation 5a it is apparent that, in the case of a theoretical coincidence of the two measured values mb2, ma2, first encoded estimated value sb2, as it was formed by primary unit B in step 142 (FIG. 4) may be directly obtained. Still considering the ideal case, secondary unit A may thus ascertain first estimated value rb1 from the first encoded estimated value sb2 thus ascertained by using the shared decoding method and check that it is identical with first random number ra1. If it is identical, i.e., ra1=rb1, secondary unit A may advantageously conclude that primary unit B also has the correct first random number ra1 and may also, like primary unit B, derive a secret key from first random number ra1 for future encrypted communication with primary unit B.

In a real system, it can be expected also here that measured values mb2, ma2 are not identical, but may possibly differ at some bit locations of the digital data words. Also here, a certain difference between measured values mb2, ma2, which, according to Equation 5a results in a "corrupted" first encoded estimated value sb2 may be compensated with the aid of error-correcting encoding and decoding methods of steps 142, 94, so that despite a non-negligible difference ma2–mb2 when first encoded estimated value sb2 is decoded in step 94 by secondary unit A, the correct first random number ra1 may be ascertained again.

Due to the masking according to the present invention of pieces of information I1, I2 transmitted over communication channel F (FIG. 1), which is unprotected per se, attacker E may be advantageously prevented from gaining knowledge of first random number ra1, so that the latter forms a secure common basis for deriving cryptographic keys in units A, B. At the same time, the entropy introduced into first and second pieces of information I1, I2 due to first random number ra1 provides further enhanced security even if measured values ma1, mb2 used for forming first and second pieces of information I1, I2 have little entropy themselves due to a static character of communication channel F.

A further specific embodiment of the method according to the present invention, having the secure exchange of information between units A, B as subject matter is described below with reference to FIG. 5.

A first measured value ma1 (for example, obtained as described previously with reference to FIG. 2) is encoded in step 300 using a second encoding method. The second encoding method is designed here for obtaining first pieces of parity information pa1 of first measured value ma1, the second encoding method, as well as a corresponding second decoding method, being known to both secondary unit A and primary unit B.

Applying 300 the second encoding method to first measured value ma1 yields result E:

$$E = ma1 \| pa1,$$

where operator $\|$ denotes a concatenation of first measured value ma1 and first pieces of parity information pa1 obtained with the aid of encoding 300. In other words, result E of encoding 300 from FIG. 5, as previously, contains first measured value ma1 in plain text, supplemented by first pieces of parity information pa1 ascertained during encoding 300.

Step 302 provides masking of first measured value ma1, in particular, by applying an exclusive-or link to first measured value ma1 and a first random number ra1 (obtained, for example, as described previously, with reference to FIG. 2), to obtain a first masked measured value ma1ra1:

$$ma1ra1 = ma1 \text{ XOR } ra1 \qquad \text{(Equation 6)}$$

Finally, in step 302, first piece of parity information pa1 is combined with first masked measured value ma1ra1 to obtain first pieces of information I1:

$$I1 = pa1, ma1ra1 \qquad \text{(Equation 7)}$$

where the step of combining, or the comma in Equation 7, indicates that first piece of parity information pa1, together with first masked measured value ma1ra1 forms first piece of information I1. However, combining does not represent concatenation in the sense of inseparable chaining or the like, so that first piece of information, even without knowing the values of its components pa1, ma1ra1, allows parity information pa1 to be separated from first masked measured value ma1ra1. For example, attacker E (FIG. 2) may read first piece of parity information pa1 as such in plain text, as well as first masked measured value ma1ra1, which however does not affect the security of the present method, since attacker E is unable to infer first random number ra1 from parity information pa1, and, since first measured value ma1 is masked by first random number ra1, whereby attacker E, even knowing pa1, is unable to infer first measured value ma1 or first random number ra1 just by knowing masked measured value ma1ra1.

After step 302, first pieces of information I1 are transmitted via communication channel F (FIG. 2), to primary unit B, which receives first pieces of information I1 in step 100.

Thereafter, primary unit B carries out a measurement in step 110, specifically a measurement of the same physical variable that was the subject matter of the measurement by secondary unit A of first measured value ma1 as input variable for block 300 i.e., in this case of the RSS parameter, for example, whereby a second measured value mb1 is obtained.

Figure 6:
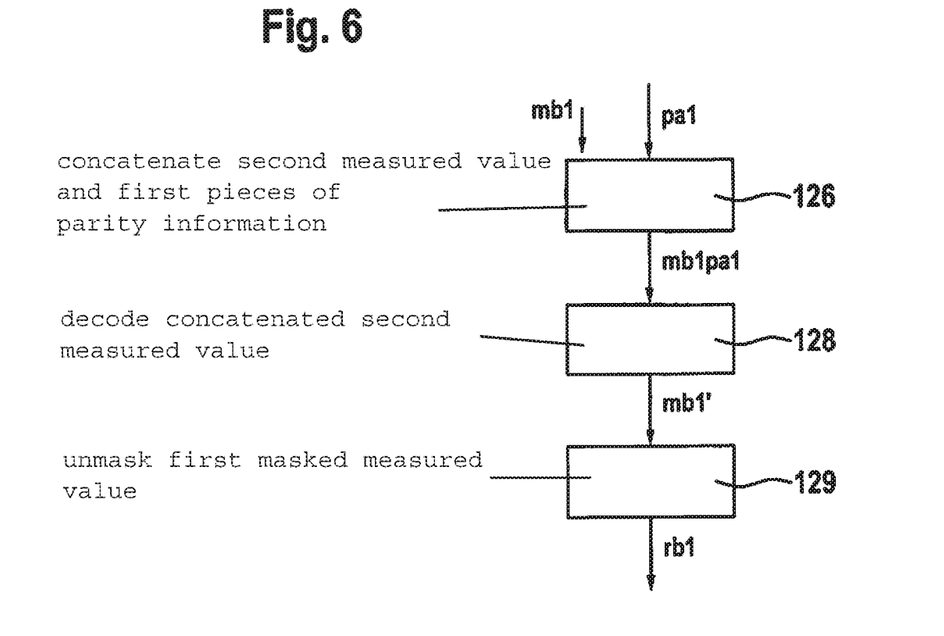
FIGS. 6, 7, 8 each schematically shows a flow chart of a further specific embodiment of the method according to FIG. 5.

Subsequently, in step 120, a first estimated value rb1 for first random number ra1 is ascertained, step 120 including the following steps, see also the flow chart of FIG. 6: concatenating 126 second measured value mb1 and first pieces of parity information pa1 to form a concatenated second measured value mb1*pa*1; decoding 128 concatenated second measured value mb1*pa*1 using the second decoding method to obtain a decoded second measured value mb1'; unmasking 129 the first masked measured value, in particular, by applying an exclusive-or link to first masked measured value and decoded second measured value mb1' to obtain first estimated value rb1 for first random number ra1.

Concatenated second measured value mb1*pa*1 is obtained, for example, from the following formula:

$$mb1pa1 = mb1 \| pa1 \quad \text{(Equation 8)}$$

First masked measured value ma1*ra*1 is unmasked 129, for example, according to the following equation:

$$rb1 = ma1ra1 \text{ XOR } mb1' = (ma1 \text{ XOR } ra1) \text{ XOR } mb1'$$

$$rb1 = (ma1 \text{ XOR } mb1') \text{ XOR } ra1 \quad \text{(Equation 9)}.$$

Since during decoding 128 and the corresponding step of encoding 300 (FIG. 5), an error-correcting code is preferably used, which delivered the first pieces of parity information pa1 obtained by primary unit B in the form of a part of first pieces of information I1 (step 100), primary unit B, during decoding 128 using first pieces of parity information pa1, which, as a result of previous concatenation 126, has been appended to second measured value mb1 obtained locally in primary unit B, may correct any differences arising between second measured value mb1 obtained locally in primary unit B and first measured value ma1, which has been obtained by secondary unit A, i.e., decoding with the aid of equation 8 results in mb1'=ma1, so that, according to equation 9 the correct random number ra1 is obtained as first estimated value rb1 for first random number ra1:

$$rb1 = (ma1 \text{ XOR } mb1') \text{ XOR } ra1 = (ma1 \text{ XOR } ma1) \text{ XOR } ra1$$

$$rb = ra1 \quad \text{(Equation 9a)}$$

In step 130, a third measured value mb2 is ascertained by primary unit B, specifically again by measuring the same physical variable that was the subject matter of the measurement by secondary unit A, of first measured value ma1 as input variable for block 300.

Figure 7:
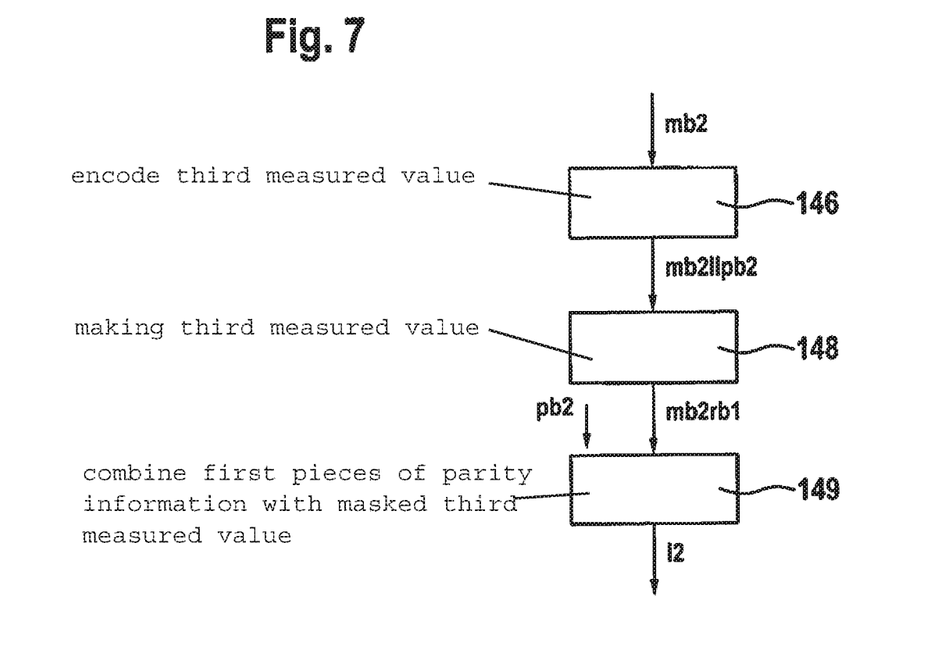
Figure 8:
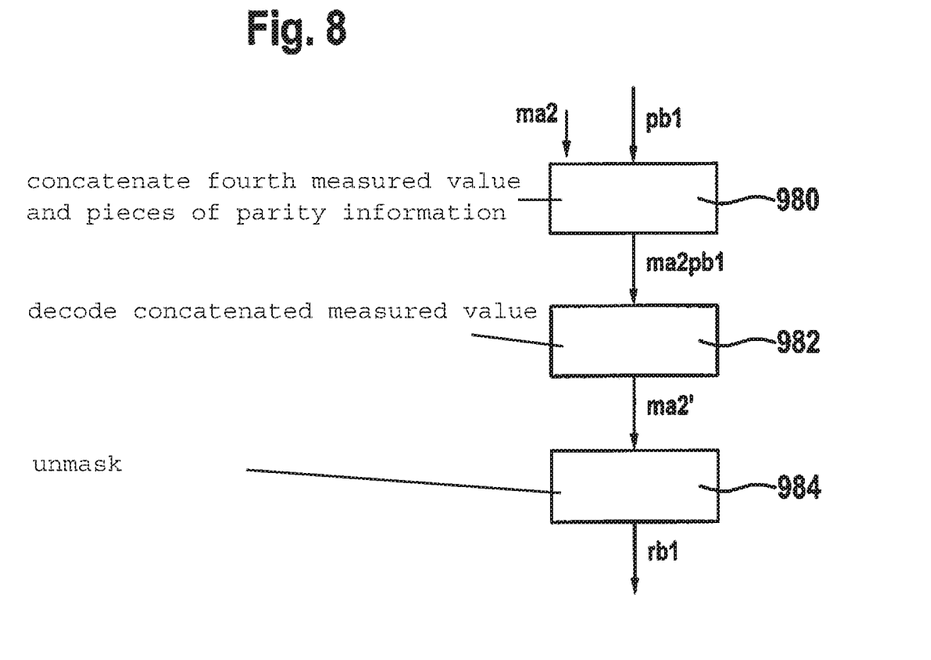

Finally, in step 140, second pieces of information I2 are formed by primary unit B as a function of first estimated value rb1 and third measured value mb2; due to an advantageous specific embodiment, forming 140 of second pieces of information I2 includes the following steps, see also FIG. 7: encoding 146 third measured value mb2 using the second encoding method to obtain first pieces of parity information pb2 of third measured value mb2; masking 148 third measured value mb2, in particular, by applying an exclusive-or link to third measured value mb2 and first estimated value rb1, to obtain a masked third measured value; combining 149 first pieces of parity information pb2 of third measured value mb2 with the masked third measured value to obtain second pieces of information I2.

Applying 146 the second encoding method to third measured value mb2 yields a result E2:

$$E2 = mb2 \| pb2$$

where the operator ∥ denotes a concatenation of third measured value mb2 and pieces of parity information pb2 obtained by encoding 146. In other words, result E2 of encoding 146 of FIG. 7 contains, as previously, third measured value mb2 in plain text, supplemented by first pieces of parity information pb2 ascertained during encoding 146.

Step 148 of FIG. 7 provides masking of third measured value mb2, for example, according to the following equation, whereby a masked third measured value mb2*rb*1 is obtained:

$$mb2rb1 = mb2 \text{ XOR } rb1 \quad \text{(Equation 10)}$$

Finally, masked third measured value mb2*rb*1 is combined with pieces of parity information pb2, in step 149, and this combination is transmitted as second pieces of information I2 from primary unit B to secondary unit A, which receives the second pieces of information in step 96 and analyzes them in step 98.

Figure 5:
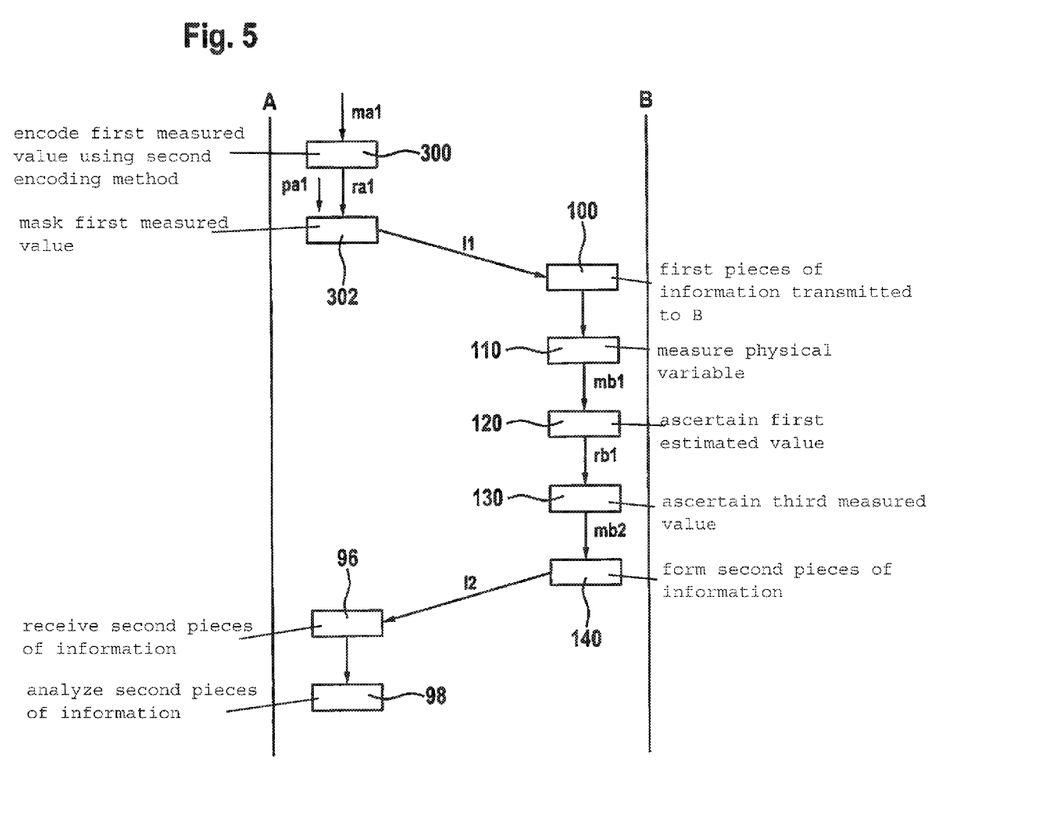
FIG. 5 schematically shows a flow chart of a further specific embodiment of the method according to the present invention.

Analysis 98 of second pieces of information I2 in secondary unit A according to FIG. 5 may include the following steps, for example:

Ascertaining a fourth measured value ma2 (here again an RSS measured value from a communication with primary unit B) and concatenating 980 fourth measured value ma2 and pieces of parity information pb1 from second pieces of information I2 to form a concatenated fourth measured value ma2*pb*1, for example, according to the following equation:

$$ma2pb1 = ma2 \| pb1 \quad \text{(Equation 11)}$$

Thereafter, concatenated fourth measured value ma2*pb*1 is decoded 982, from which a decoded fourth measured value ma2' is obtained, and masked third measured value mb2*rb*1, which is also part of second pieces of information I2, is unmasked 984 (FIG. 5), by applying an exclusive-or link to the masked third measured value and decoded fourth measured value ma2', to obtain first estimated value rb1 for first random number ra1.

Masked third measured value mb2*rb*1 is unmasked 984, for example, according to the following equation:

$$rb1 = mb2rb1 \text{ XOR } ma2' = (mb2 \text{ XOR } rb1) \text{ XOR } ma2'$$

$$rb1 = (mb2 \text{ XOR } ma2') \text{ XOR } rb1 \quad \text{(Equation 12)}$$

Since during decoding 982 and the corresponding encoding step 146 (FIG. 7), an error-correcting code is preferably used, which delivered pieces of parity information pb1 obtained by secondary unit A in the form of a part of second pieces of information I2 (step 96), secondary unit A may correct any differences that may arise during decoding 982 between third measured value mb2 obtained locally in primary unit B and fourth measured value ma2 obtained by secondary unit A using pieces of parity information pb1, i.e., decoding in step 982 results in ma2'=mb2, so that the correct random number ra1 is obtained as first estimated value rb1 for first random number ra1, according to Equation 12 (provided it has been correctly ascertained previously in step 124 by primary unit B, rb1=ra1):

$$rb1 = (mb2 \text{ XOR } ma2') \text{ XOR } rb1 = (mb2 \text{ XOR } mb2) \text{ XOR } rb1$$

$$rb1 = ra1$$

Using the masking according to the present invention according to FIG. 5, of pieces of information I1, I2 transmitted via communication channel F (FIG. 1), which is unprotected per se, attacker E may be advantageously prevented from acquiring knowledge of first random number ra1, so that the latter forms a secure shared basis for deriving cryptographic keys in units A, B. At the same time, the entropy introduced into first and second pieces of information I1, I2 due to first random number ra1 provides further enhanced security even if measured values ma1, mb2 used for forming first and second pieces of information I1, I2 have little entropy themselves due to a static character of communication channel F.

As long as the analysis of steps 94 (FIG. 2) and 98 (FIG. 5) results in that estimated value rb1 ascertained by primary unit B is not identical to first random number ra1 previously ascertained by secondary unit A, it may be concluded that there is an error or a manipulation attempt during the process of FIGS. 2, 5. The reasons therefor may be, in particular: lack of correlation of the measured values ascertained by units A, B (so that the error-correcting encoding/decoding methods were unable to compensate for the inherent differences between the different measured values); corruption (for example, due to targeted injection of other data by attacker E) of first and/or second pieces of information I1, I2, for example, during transmission via communication channel F; use of non-matching encoding and decoding methods by units A, B. In these cases, secondary unit A may advantageously ascertain a first random number ra1 again and the method according to FIG. 2 or FIG. 5 may be repeated. If necessary, this method may be repeated until analysis 94, 98 results in that both units A, B have the same first random number ra1 or there is a different abort criterion (for example, maximum number of runs of the method according to FIGS. 2, 5).

Another advantage of the present invention is that the relatively complex and computation-intensive decoding must be carried out only by primary unit B, while secondary unit A has to carry out relatively few complex steps (ascertaining measured values, ascertaining and, if necessary, concatenating random number ra1, encoding, masking).

In addition, both units A, B may themselves advantageously check, with great reliability, whether the information exchange has worked error-free, since they are able to check the information themselves based on the masked data and the random number or the ascertained measured values.

After successful analysis 94, 98, it is confirmed that both units A, B have the same random number ra1. This may be advantageously used for deriving cryptographic keys for encrypted communication between units A, B.

In a further, particularly advantageous specific embodiment, one unit according to the present invention has both the functionality of primary unit B and of secondary unit A, so that it may optionally operate as a primary or secondary unit in the sense of the preceding description.

It is also possible to integrate the functionality of secondary unit A into mobile terminals such as smart phones, tablets, or control units for motor vehicles, household appliances, or the like, and to provide the functionality of primary unit B in a central unit, for example, in a server system, with which secondary units A may communicate.

In a further specific embodiment, it may also be provided that the primary unit forms a hash value of the random number ascertained by it or of the corresponding estimated value and transmits this hash value to the secondary unit. The secondary unit may thus verify whether the primary unit has the correct estimated value for the random number.

What is claimed is:

1. A method for operating a primary unit, the primary unit exchanging pieces of information with a secondary unit, the method comprising:
receiving first pieces of information from the secondary unit, the first pieces of information being formed as a function of at least one first measured value of a physical variable in an area of the secondary unit and as a function of a first random number;
measuring the at least one physical variable in an area of the primary unit to obtain a second measured value;
ascertaining a first estimated value for the first random number as a function of the first pieces of information and of the second measured value;
measuring the at least one physical variable in the area of the primary unit to obtain a third measured value;
forming second pieces of information as a function of the first estimated value and of the third measured value; and
transmitting the second pieces of information to the secondary unit.

2. The method as recited in claim 1, wherein:
the formation of the first pieces of information includes:
encoding the first random number using a first encoding method to obtain a first encoded random number, the first encoding method and a corresponding first decoding method being known to both secondary unit and primary unit; and
masking the first encoded random number by applying an exclusive-or link to the first measured value and the first encoded random number, to obtain the first pieces of information; and
the ascertainment of the first estimated value for the first random number includes:
unmasking the first pieces of information by applying an exclusive-or link to the first pieces of information and the second measured value to obtain unmasked first pieces of information; and
decoding the unmasked first pieces of information using the first decoding method to obtain the first estimated value for the first random number.

3. The method as recited in claim 2, wherein the formation of the second pieces of information includes:
encoding the first estimated value with the aid of the first encoding method to obtain a first encoded estimated value; and
masking the third measured value by applying an exclusive-or link to the third measured value and the first encoded estimated value.

4. The method as recited in claim 2, wherein:
the formation of the first pieces of information includes:
encoding the first measured value using a second encoding method to obtain first pieces of parity information of the first measured value, the second encoding method and a corresponding second decoding method being known to both the secondary unit and the primary unit;
masking the first measured value by applying an exclusive-or link to the first measured value and the first random number to obtain a first masked measured value; and
combining the first pieces of parity information with the first masked measured value to obtain the first pieces of information; and
the ascertainment of the first estimated value for the first random number includes:

concatenating the second measured value and the first pieces of parity information to form a concatenated second measured value, decoding the concatenated second measured value using the second decoding method to obtain a decoded second measured value, and unmasking the first masked measured value by applying an exclusive-or link to the first masked measured value and the second measured value to obtain the first estimated value for the first random number.

5. The method as recited in claim 4, wherein at least one of the first encoding method and the second encoding method is an error-correcting encoding method.

6. The method as recited in claim 1, wherein the formation of second pieces of information includes:

encoding the third measured value using an encoding method to obtain first pieces of parity information of the third measured value;

masking the third measured value by applying an exclusive-or link to the third measured value and the first estimated value to obtain a masked third measured value; and combining the first pieces of parity information of the third measured value with the masked third measured value to obtain the second pieces of information.

7. The method as recited in claim 1, wherein the primary unit ascertains a secret key for encrypted communication with the secondary unit, as a function of at least one of the first estimated value, the first measured value, the second measured value, and the third measured value.

8. The method as recited in claim 1, wherein the first pieces of information are formed by applying an exclusive-or link to input formed from the at least one first measured value and the first random number.

9. The method as recited in claim 8, wherein the ascertaining the first estimated value is performed by applying the exclusive-or link to input formed from the received first pieces of information and the second measured value.

10. The method as recited in claim 1, further comprising, subsequent to the transmission of the second pieces of information, the primary unit decoding data from the secondary unit using a key formed from the first estimated value.

11. The method as recited in claim 10, wherein the first estimated value is the key.

12. A method for operating a secondary unit, the secondary unit exchanging pieces of information with a primary unit, the method comprising:

forming first pieces of information as a function of at least one first measured value of a physical variable in an area of the secondary unit and as a function of a first random number;

transmitting the first pieces of information from the secondary unit to the primary unit;

receiving second pieces of information from the primary unit; and analyzing the second pieces of information.

13. The method as recited in claim 12, wherein the secondary unit ascertains a secret key for encrypted communication with the primary unit, as a function of at least one of: the analysis, the first measured value, and the first random number.

14. The method as recited in claim 12, wherein the formation of the first pieces of information includes:

encoding the first random number using a first encoding method to obtain a first encoded random number, the first encoding method and a corresponding first decoding method being known to both the secondary unit and the primary unit; and masking the first encoded random number by applying an exclusive-or link to the first measured value and the first encoded random number, to obtain the first pieces of information.

15. The method as recited in claim 12, wherein the formation of the first pieces of information includes:

encoding the first measured value using an encoding method to obtain first pieces of parity information of the first measured value, the encoding method and a corresponding decoding method being known to both the secondary unit and the primary unit;

masking the first measured value by applying an exclusive-or link to the first measured value and the first random number to obtain a first masked measured value; and combining the first pieces of parity information with the first masked measured value to obtain the first pieces of information.

16. The method as recited in claim 12, wherein the first pieces of information are formed by applying an exclusive-or link to input formed from the at least one first measured value and the first random number.

17. The method as recited in claim 16, wherein the analyzing includes applying the exclusive-or link to input formed from the received first pieces of information and the physical variable.

18. The method as recited in claim 12, further comprising, subsequent to the analysis of the second pieces of information, the secondary unit encoding data using a key formed from the first random number and transmitting the encoding data to the primary unit.

19. The method as recited in claim 18, wherein the first random number is the key.

20. A method for operating a system including at least one primary unit and one secondary unit, wherein the primary unit exchanges pieces of information with the secondary unit, the method comprising:

the secondary unit carrying out:

forming first pieces of information as a function of at least one first measured value of a physical variable in an area of the secondary unit and as a function of a first random number;

transmitting the first pieces of information to the primary unit;

receiving second pieces of information from the primary unit; and analyzing the second pieces of information; and the primary unit carrying out:

receiving the first pieces of information from the secondary unit;

measuring the at least one physical variable in an area of the primary unit to obtain a second measured value;

ascertaining a first estimated value for the first random number as a function of the first pieces of information and of the second measured value;

measuring the at least one physical variable in the area of the primary unit to obtain a third measured value;

forming the second pieces of information as a function of the first estimated value and of the third measured value; and transmitting the second pieces of information to the secondary unit.

21. A primary unit for exchanging pieces of information with a secondary unit, the primary unit comprising:
   a processor; and
   a communication interface;
   wherein the processor is configured to:
      receive first pieces of information from the secondary unit via the communication interface, the first pieces of information being formed as a function of at least one first measured value of a physical variable in an area of the secondary unit and as a function of a first random number,
      measure the at least one physical variable in an area of the primary unit to obtain a second measured value,
      ascertain a first estimated value for the first random number as a function of the first pieces of information and of the second measured value;
      measure the at least one physical variable in the area of the primary unit to obtain a third measured value;
      form second pieces of information as a function of the first estimated value and of the third measured value; and
      transmit the second pieces of information to the secondary unit via the communication interface.

22. A secondary unit for exchanging information with a primary unit, the secondary unit comprising:
   a processor; and
   a communication interface; and
   wherein the processor is configured to:
      form first pieces of information as a function of at least one first measured value of a physical variable in an area of the secondary unit and as a function of a first random number;
      transmit the first pieces of information from the secondary unit to the primary unit via the communication interface;
      receive second pieces of information from the primary unit via the communication interface; and
      analyze the second pieces of information.

* * * * *